Patented Oct. 4, 1927.

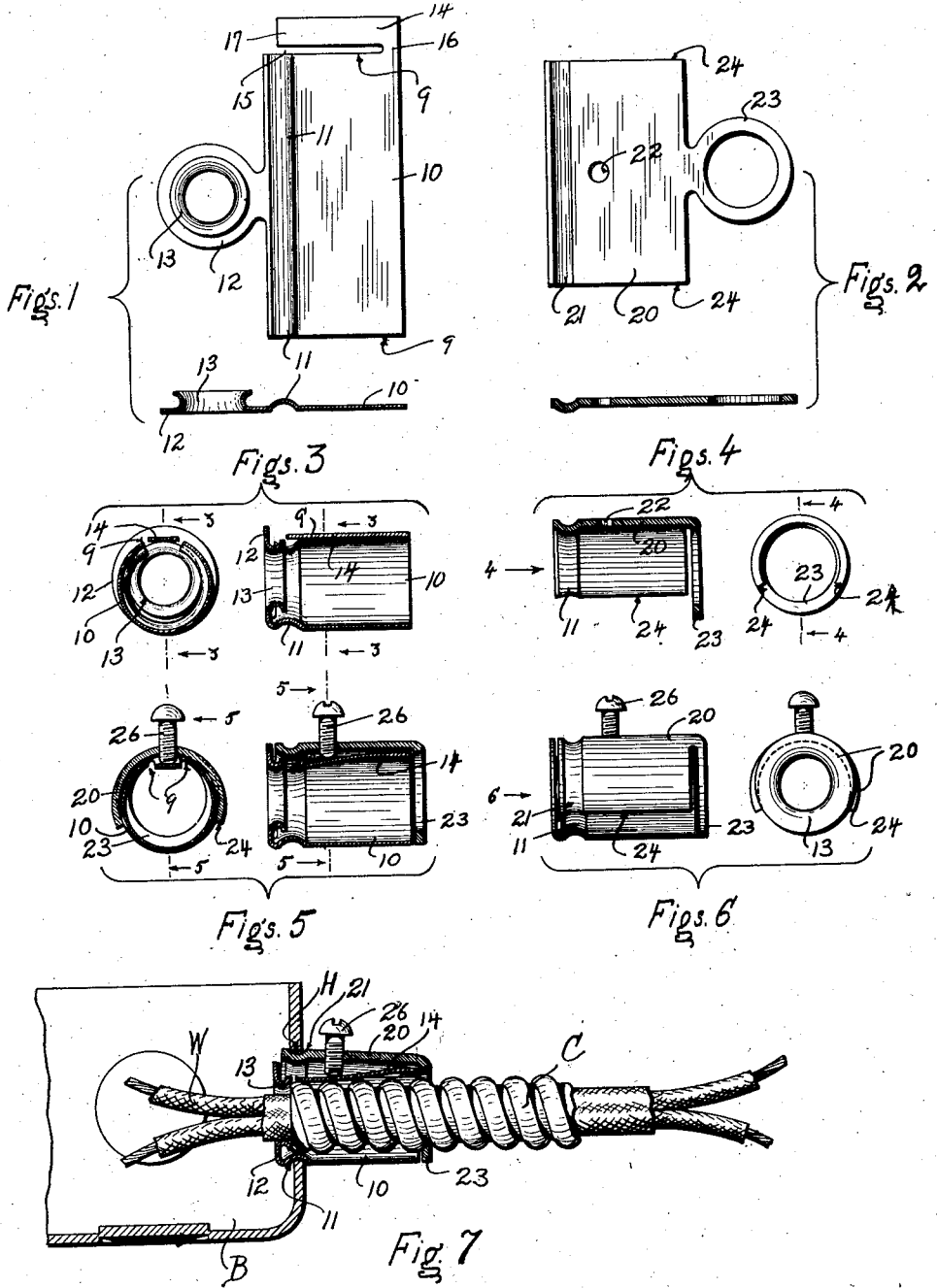

1,644,307

UNITED STATES PATENT OFFICE.

JAMES CAMROD LEDBETTER, OF NEW YORK, N. Y., ASSIGNOR TO THE THOMAS & BETTS CO., OF ELIZABETH, NEW JERSEY, A CORPORATION OF NEW JERSEY.

CABLE CONNECTER.

Application filed November 24, 1925. Serial No. 71,034.

This invention relates to cable connecters and more particularly relates to improvements in sleeve connecter construction intended to reduce the cost of manufacture and increase the holding or anchoring capacity of the connecter.

Primarily it is an object of this invention to construct a cable connecter of composite parts, one of which is preferably made of heavy metal in the form of a frame, casing or main member to carry substantially powerful cable clamping means such as a screw or other pressure developing or operating means, while the other part is made of light weight metal easy and economical to work as by punching and drawing it to produce a wire bushing as well as cutting and working it to produce a flexible bearing clamp plate which is forced against a cable by action of the screw or pressure developing means.

Also, it is an object of this invention to produce a cable connecter which has closed sleeve ends and which has cylindrical walls sealed and closed against expansive slits yet which sleeve at the same time is provided with expansive slits to enable it to expand and anchor itself in the cable opening or hole of an electrical fixture or outlet box.
With the above and other objects in view, the invention has relation to a new combination and relation of parts and a new mode of operation and use as herein disclosed and reference is now made to the accompanying drawings for an understanding of the principles involved.

Figure 1 shows two views of the light weight or light gauge sheet metal stamping or blank which is shown as punched and drawn but just prior to curving or rolling the same into partial sleeve form.

Figure 2 shows two views of the heavier gage metal blank before it is fashioned into the main connecter member of circular sleeve form but after it is punched and grooved or ribbed.

Figure 3 shows two views of the light gauge metal stamping of Figure 1 after it is fashioned into circular sleeve form, each view being a section taken on the line 3—3 of the other.

Figure 4 shows the heavy gauge metal stamping of Figure 2 after it is fashioned into sleeve form.
Figure 5 shows two assembly views of the light and heavy weight metal sleeves brought together and assembled to complete the connecter, each view being a section taken on the line 5—5 of the other view.

Figure 6 shows an outside view and an end view of the assembled cable connecter.

Figure 7 shows a longitudinal sectional assembly view of the connecter placed in service position in an electrical fixture box B together with an armored cable C anchored thereto.

Referring further to the drawings for a more detailed description of the invention, there is shown a light weight thin gauge metal stamping or blank 10 with end edges 9. This part 10 is rectangular in shape and made with a rib or groove 11 pressed thereinto along one side which extends from end to end of the blank. The blank is made with an integral ring 12 flared and drawn to produce a cable wire bushing 13. The blank 10 is also made with a bearing clamp plate 14 which is preferably located adjacent one end 9 of the stamping and which is cut from the stamping by a shear or slot line 15 and it is left hanging on the stamping by a narrow neck of stock 16 thereby affording a relatively free movable end 17.

The blank or part 10 is curved or rolled into sleeve form as shown in Figure 3. The groove or rib 11 is made in the blank 10 either before or after the blank is fashioned into sleeve form, that operation depending somewhat upon the mode of manufacture, while the ring 12 is bent up rightangular to the axis of the sleeve 10. Thus is made a sleeve with a rib 11 which forms part of the sleeve anchorage means by which the connecter fixes itself in an opening H of the box B.

The ring 12 serves to close one end of the sleeve yet provides a restricted protective bushing 13 with a smooth ovaled aperture therethrough for the passage of electric wires W coming from the cable C and reaching into the box B, and the bushing supports the insulation of the wire W and holds it away from the more or less sharp, raw and jagged cable end to prevent abrading the insulation which would lead to short circuits and electric arcing in and about the connecter. The blank 10 is curled or rolled to produce a sleeve, which is subject to expansion and contraction due to the free ends 9 of the blank 10. After the blank is rolled into sleeve form, the clamp plate 14—17 lies lengthwise of the sleeve and forms a part of the wall thereof, and it is adapted to bear and clamp against the cable C as later described, and the clamp plate 14 lies movably between the end edges 9 of this light weight sleeve part 10.

A rectangular shaped metal blank part 20 is punched or constructed of sheet metal of somewhat heavier gauge metal than the connecter part hereinbefore described, and the blank 20 is provided with a lengthwise boxhole edge anchorage groove or rib 21. A tapped screw hole 22 is made in this blank. A cable receiving ring 23 is made integral on the blank. This part 20 is the main connecter member and acts as a frame, casing or foundation on which the other parts are mounted and while shown as a sleeve may assume other forms.

The connecter main member blank 20 is fashioned into circular form as shown in Figure 4 and describes a circle somewhat more than 180 degrees so as to produce a sleeve-like main member whose outer parallel edges 24 reach more than half-way around the circumference and thereby substantially embrace or encircle the inner lighter weight metal sleeve 10 already described. The cable receiving ring 23 is bent up at right angles to the axis of the sleeve 20 thereby serving to partly close one end of this part.

Having described the structure of each stamped part 10 and 20, which may be referred to as sleeve or sleeve-like parts, it is now in order to explain that these two parts are assembled by nesting the lighter weight sleeve 10 within the heavier sleeve 20. This assembly is accomplished by simply telescoping the parts and thrusting one upon the other until the two ribs or grooves 11 and 21 move into place or register one with the other and become inseparably engaged by a snapping action which thus holds the two sleeves in joined relation. Any suitable means, other than the registering grooves 21 and 11, may be used to hold the parts together.

The cable bearing clamp plate 14 carried on the inner sleeve is free to move up and down in relation to the outer heavier sleeve frame or main connecter member and a screw 26 is mounted in the threaded hole 22 in alignment with the bearing clamp plate 14. The screw or other operating means 26 is caused to set or bear down on the plate 14 which thus brings the screw between the ends 9 of the inner sleeve 10 so that the two nested sleeve-like parts 10 and 20 may not rotate relatively one on the other, for if they do, the end edges 9 of the sleeve 10 come into contact with the inner end of the screw 26 which prevents further relative rotation between the two telescoped sleeves. In this arrangement, there is provided means for maintaining the screw 26 on the top of the bearing plate 14 so that the parts may not become disassociated after being assembled. The screw end bears on the bearing plate 14 and is disposed between the longitudinal edges 9 of the inner sleeve which prevents any possible relative rotary movement between the telescoping sleeves.

The rings 12 and 23 close each end of the sleeve 10—20 leaving an opening just large enough in the ring 23 to receive the cable C into the sleeve while the aperture in the bushing 13 is just large enough for the wires W to pass therethrough. Thus the rings go a long way towards making a sealed and closed connecter by reducing the size of the end openings to as small a size as practical.

As already suggested, the frame or connecter sleeve part 20 is preferably made of heavier stock in order that a sufficient number of threads be tapped into the hole 22. In this way a comparatively light weight connecter is provided with adequate screw and thread facilities so that a large amount of pressure may be exerted by the screw 26 without danger of stripping out the threads. Conversely, a comparatively heavy and substantial cable connecter, the part 20 being of that capacity, is provided with a light sleeve structure which is easy to punch, draw and flare so as to inexpensively produce a wire bushing 13 therein and so as to provide a light weight flexible cable bearing plate 14.

The matter of assembling and attaching together is comparatively simple there being no additional parts such as screws, rivets or ears to mount or bend into position. Assembly is an accomplished fact merely by telescoping the parts until the grooves 11 and 21 snap together.

Figure 7 makes clear the mode of use in that the cable C is passed through the receiving ring 23 and the insulation covered wires W are passed through the flared bushing 13. That portion of the cable C which is now within the connecter sleeve 10—20 has one end disposed against the bushing 13 while the ring 23 supports the metal armor C of the cable at the other end of the sleeve. The screw 26 is now set up tightly by driving the clamp plate 14 down against the cable C which may or may not be of the armored type and thus very securely attaches the cable to the connecter sleeve 10—20 by forcing the cable C against the edge of the ring 23 which bites into the cable wall or corrugation. The plate 14 serves to distribute pressure of the screw 26 over and along several corrugations of the cable C and prevents the end of the screw from burring into or damaging the cable.

When the screw 26 is set up tightly to anchor all parts in position, the telescoping sleeve parts expand, one moving relatively radially to the other, which swells or enlarges the grooved end of the connecter thus tightly anchoring the sleeve sections 10 and 20 within the box hole opening H by reason of the outwardly expanding pressure of the two sleeve parts.

This expansion readily occurs by reason of the fact that both sleeve or sleeve-like parts are split sleeves, i. e., they are split in that the longitudinal edges 9 of one and longitudinal edges 24 of the other are free and not joined edges.

The ring 23 is of course not flared or drawn but is advisedly made heavy to carry the strain of the cable pressed thereagainst by the screw 26 which delivers the pressure. The ring 12 is advisedly made light in weight because it draws and flares more easily in the process of manufacture and furthermore it is not called upon to carry any substantial strain because the cable C in reality rests upon the box wall or close to it. The box wall and the ring 23 carry most or all the pressure exerted by the cable.

Therefore I have produced a connecter, the heavy strong element of which performs the heavy duty of both imposing and receiving the strain, and the light part of which is designed to bush and protect the wires and enclose the parts as well as prevent the screw from biting into the cable. In this respect the heavy part 20 may be denominated the connecter main member or frame or casing which carries the strain while the light part 10 may be said to act as a protective lining since it lies within the casing 20 and protects and surrounds the wires W and cable C to prevent the insulation from being damaged, broken or cut by the ragged and sharp edges of the end of the cable C and to prevent the emission of sparks.

The last named feature is very important because the cable end is nearly always sharp and jagged due to the manner in which the workman on the job cuts the armor and a great and practical advantage, indeed a necessity, exists in having the well flared smooth bushing ring 13 fit closely up to the end of the casing 20 and fit up closely to the ragged end of the cable C so it may not damage the insulation of the wire during the operation of jerking and pulling the wires W about in the box B incident to making the electrical connections in the box.

What I claim is:

1. A cable connecter comprising, a heavy metal connecter main member, anchorage means made on the main member by which it fastens itself in a box opening, a lightweight sheet metal protective sleeve-like part carried with the main member and adapted to surround a cable in the connecter, a bushing integrally formed on the protective part against which the cable end rests and through which wires of the cable pass, means formed on the connecter main member and sleeve-like part including registering grooves for joining together the connecter main member and protective part, and operating means carried on the connecter main member rendering effective the aforesaid anchorage means and acting simultaneously to fasten a cable in the connecter.

2. A cable connecter comprising, two telescoping members, each of which are provided with a groove into which is adapted to rest the rim of a box hole to anchor the connecter in a box, said grooves being made in circumferential alignment and registering one in the other to hold together the members, and means carried on the connecter to fix a cable therein and simultaneously expand the grooves aforesaid in and against a box hole rim.

3. A cable connecter comprising, a heavy gage metal main member provided with a tapped screw hole, said main member having a groove therein formed to embrace the edge of a box hole to anchor itself in a box, a cable receiving ring integral with the main member against which a cable rests when introduced into the connecter, a clamp screw mounted in the main member screw hole aforesaid and adapted to apply pressure on the cable and simultaneously force the aforesaid groove of the main member into registry with the edge of a box hole aforesaid, a circular bushing made of light gage metal carried in the main member through which wire of the cable passes and against which the raw cable end rests, means anchoring the bushing in the main member, and a flexible bearing plate integral with the bushing and disposed directly between the screw and cable to distribute the pressure along said cable.

4. A cable connecter comprising a pair of telescoping parts, said parts being constructed of sheet metal of different gage thereby making one part light in weight and flexible and the other part being heavy in weight and rigid, a cable clamp means carried on the heavy rigid part by which cable is fixed in the connecter, a bearing clamp plate integral with the light weight part being flexible and cooperating with the clamp means to distribute pressure along the cable, and connecter anchorage means made on the connecter by which it is anchored to a box.

5. A cable connecter comprising two telescoping split sleeve like parts; connecter anchorage grooves made on each part performing two functions namely, to register one in the other to hold the parts together, and to act as anchorage means by expanding against a box hole edge; a screw mounted in one part to produce an expanding reaction and thus force the grooves into engagement with said box hole, and a flexible clamp plate integrally attached at one end thereof to one part and cooperating with the screw to fix a cable in the connecter.

6. A cable connecter comprising a plurality of telescoping sleeve-like parts, the inner part being made of thin gage metal, the outer part being made of thick gage metal, a cable clamp screw carried in the thick metal part, a bearing clamp plate made on the inner thin metal part and cooperating with the screw to fix a cable in the connecter, and connecter anchorage means made on the connecter by which it is fixed in a box hole.

7. A cable connecter comprising a pair of telescoping sleeve-like parts, the inner part being made of thin gage metal, a wire bushing integral with the inner part and partly closing one end of the part, an outer sleeve-like part being made of thick gage metal, a cable receiving ring made on the thick gage metal part, and partially closing the other end of the part, a cable clamp screw carried in the thick metal part, a bearing clamp plate made on the inner thin metal part and lying underneath the screw to force the cable to seat against the cable receiving ring, and connecter anchorage means made on the connecter and including means acted on by the screw by which the anchorage means is rendered effective to secure the connecter in a box hole.

8. A cable connecter comprising a pair of sheet metal stampings fashioned into sleeve-like parts, a groove pressed into each part, the pair of parts being telescoped causing the grooves to register one with the other to connect the parts in assembled relation, a bearing clamp plate attached to one of the stampings and disposed inside the connecter when assembled, and a screw carried on the connecter and adapted to force the clamp plate against a cable in the connecter.

9. A cable connecter comprising a pair of sheet metal stampings fashioned into sleeve-like parts, a groove pressed into each part, the pair of parts being telescoped causing the grooves to register one with the other to connect the parts in assembled relation, the outer circumference of said grooves adapted to register with the rim of a box hole, a bearing clamp plate attached to one of the stampings and disposed inside the connecter when assembled, a screw carried on the connecter and engaging the clamp plate to force said plate against a cable in the connecter and simultaneously expand the grooves aforesaid against the rim of a box hole, a ring integrally formed on each sleeve-like part and disposed at each end of the connecter, one ring being drawn and flared at its aperture to form a wire bushing, and the other ring adapted to have the cable seated therein by the pressure of the aforesaid screw and plate.

10. A cable connecter comprising a pair of telescoping sleeve-like parts, one of which is made of substantially heavier metal than the other, a cable clamp screw mounted therein and adapted to force and bear against a cable, means on one end of this part adapted to engage and anchor against a box hole by operation of the screw aforesaid, means on the other end adapted to encircle the cable and support it when forced and seated thereagainst by operation of the screw aforesaid, and the other sleeve-like part embraced within said heavier sleeve-like part and employed as a covering for the cable.

11. A cable connecter comprising a pair of telescoping sleeve-like parts, one of which is made of substantially heavier metal than the other, a cable clamp screw mounted therein adapted to bear against a cable, means on one end of this heavy part adapted to anchor itself in a box hole by operation of the screw aforesaid, means on the other end of the heavy part adapted to encircle the cable and support it when forced and seated thereagainst by operation of the screw aforesaid, the other and lighter weight sleeve-like part being embraced within said heavier part and employed as a covering for the cable, and a bushing ring made on this last named light weight part.

In testimony whereof I affix my signature.

JAMES CAMROD LEDBETTER.